(12) United States Patent
Shao et al.

(10) Patent No.: US 9,759,858 B2
(45) Date of Patent: Sep. 12, 2017

(54) DISPLAY MODULE AND MOBILE TERMINAL

(71) Applicant: Hisense Electric Co., Ltd., Qingdao (CN)

(72) Inventors: Kun Shao, Qingdao (CN); Zhe Xing, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 28 days.

(21) Appl. No.: 14/743,136

(22) Filed: Jun. 18, 2015

(65) Prior Publication Data
US 2016/0187571 A1 Jun. 30, 2016

(30) Foreign Application Priority Data
Dec. 24, 2014 (CN) .......................... 2014 1 0819769

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02B 6/0031* (2013.01);
(Continued)

(58) Field of Classification Search
CPC .... G02B 6/0088; G02B 6/005; G02B 6/0068; G02B 6/0011; G02B 6/0013;
(Continued)

(56) References Cited

U.S. PATENT DOCUMENTS 5,808,708 A * 9/1998 Oyama ................ G02B 6/0018
349/62
6,626,552 B2 * 9/2003 Uehara ............ G02F 1/133615
362/561
(Continued)

FOREIGN PATENT DOCUMENTS

CN 101504125 A 8/2009
CN 102086995 A 6/2011
(Continued)

*Primary Examiner* — Edward Glick
*Assistant Examiner* — Shan Liu
(74) *Attorney, Agent, or Firm* — Harness, Dickey & Pierce, P.L.C.

(57) ABSTRACT

The disclosure provides a display module and a mobile terminal, and the display module includes a liquid crystal panel and a backlight module, wherein the backlight module includes: a light guiding plate including a light incidence surface and a light exit surface, wherein protruding ridges which are light transmitting members are arranged at edges of the light exit surface; a set of optical sheets arranged on the light exit surface of the light guiding plate and engaged between the protruding ridges; and a light source arranged opposite to the light incidence surface, wherein the liquid crystal panel is arranged on the side of the set of optical sheets away from the light exit surface, and the liquid crystal panel is arranged to cover the surfaces of the protruding ridges.

20 Claims, 6 Drawing Sheets

(52) U.S. Cl.
CPC .......... *G02B 6/0068* (2013.01); *G02B 6/0073* (2013.01); *G02F 1/1333* (2013.01)

(58) Field of Classification Search
CPC .. G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 6/0073; G02B 6/0083; G02B 21/0032; G02B 21/06; G02B 21/16; G02B 2006/12083; G02B 2006/12085; G02B 2006/12088; G02B 2006/1209; G02B 2006/12092; G02B 2006/12095; G02B 6/0035; G02B 6/0036; G02B 6/0038; G02B 6/004; G02B 6/0041; G02B 6/0043; G02B 6/0045; G02B 6/0046; G02B 6/0048; G02B 6/0051; G02B 6/0053; G02B 6/0055; G02B 6/0056; G02B 6/0058; G02B 6/006; G02B 6/0061; G02B 6/0063; G02B 6/00665; G02B 6/0066; G02B 6/0033; G02F 1/1333; G02F 1/1336; G02F 2001/133607; G02F 2001/133616; G02F 1/133504; G02F 1/133615; G02F 1/133308; G02F 2001/133317; G02F 2001/133322; G02F 1/133605; G02F 2001/133626; G02F 1/133305; G02F 1/136277; G02F 2001/133302; G02F 2001/133368; G02F 2001/133354; G02F 2201/56; G02F 1/133606; G01N 21/62; G01N 21/6458; G01N 6/1226; B02B 6/007; B02B 6/0071; B02B 6/0073; B02B 6/0075; B02B 6/0076; B02B 6/0078; B02B 6/008; B02B 6/10; B02B 6/102; B02B 6/105; B02B 6/107; B02B 6/122; B02B 6/1221; B02B 6/1223; B02B 6/1225; B02B 6/1226; B82Y 20/00; H01L 27/12; H01L 27/1203; H01L 27/1218; H01L 21/02367
USPC ................ 349/61–67, 158; 359/385; 385/129
See application file for complete search history.

(56) References Cited

U.S. PATENT DOCUMENTS

| | | | |
|---|---|---|---|
| 2002/0050974 A1* | 5/2002 | Rai .................... | G09G 3/3406 345/102 |
| 2004/0239831 A1* | 12/2004 | Palumbo ............. | G02B 6/0018 349/64 |
| 2005/0117197 A1* | 6/2005 | Ide ...................... | G02F 1/1333 359/291 |
| 2008/0170170 A1* | 7/2008 | Jung .................... | G02B 6/0021 349/58 |
| 2009/0015747 A1* | 1/2009 | Nishizawa ........ | G02F 1/133308 349/58 |
| 2009/0196067 A1* | 8/2009 | Chen .................... | G02B 6/002 362/606 |
| 2012/0008308 A1* | 1/2012 | Adachi ................ | G02B 6/0021 362/97.2 |
| 2014/0168090 A1* | 6/2014 | Aaltonen ............. | G06F 1/1601 345/173 |
| 2014/0253845 A1* | 9/2014 | Shibata ................ | G02B 6/0038 349/65 |
| 2015/0049285 A1* | 2/2015 | Qian .................... | G02B 6/0073 349/106 |
| 2016/0291386 A1* | 10/2016 | Wang .................... | G02B 6/00 |

FOREIGN PATENT DOCUMENTS

| | | |
|---|---|---|
| JP | 2002098959 A | 4/2002 |
| JP | 2008-020545 A | 1/2008 |

* cited by examiner

DISPLAY MODULE AND MOBILE TERMINAL

CROSS-REFERENCE TO RELATED APPLICATION

This application claims the benefit and priority of Chinese Patent Application No. 201410819769.6 filed Dec. 24, 2014. The entire disclosure of the above application is incorporated herein by reference.

FIELD

The present disclosure relates to the field of display technologies and particularly to a display module and a mobile terminal.

BACKGROUND

This section provides background information related to the present disclosure which is not necessarily prior art.

At present, handsets, tablet computers and other mobile terminals have been increasingly widely applied, and also there are increasingly high requirements on these mobile terminals. A display module in a mobile terminal is particularly important, and the display module in the existing mobile terminal typically includes a backlight module and a liquid crystal panel, where the backlight module includes a light source, a back plate, an adhesive frame, and a reflective sheet, a light guiding plate, and a set of optical sheets, stacked sequentially in this order on the back plate. The adhesive frame is configured to fix the light guiding plate and the set of optical sheets, the light guiding plate includes a light incidence surface, a light exit surface, and a reflective surface, the light source is arranged face to the light incidence surface, light rays emitted by the light source enter the light guiding plate at the light incidence surface, are reflected at the reflective surface, exit from the light exit surface and then are transmitted to the liquid crystal panel, so that the display module emits the light and further the display module can display an image.

However the light rays in the light guiding plate in the prior art can be transmitted out at the sides thereof, but the side surfaces (also refers to sides) of the light guiding plate may be shielded by the adhesive frame and the back plate so that the light rays may not be transmitted out of the backlight module at the sides of the light guiding plate, and thus no light can be transmitted out at the side surfaces of the display module and further no image can be displayed, at the side surfaces of the display module, thus resulting in a limited display area. In view of this, it is highly desirable to address the issue of how to display at the side surfaces of the display module to thereby extend the display area.

SUMMARY

This section provides a general summary of the disclosure, and is not a comprehensive disclosure of its full scope or all of its features.

In an aspect of the disclosure, there is provided a display module including a liquid crystal panel and a backlight module, wherein the backlight module includes:

a light guiding plate including a light incidence surface and a light exit surface, wherein protruding ridges which are light transmitting members are arranged at edges of the light exit surface;

a set of optical sheets arranged on the light exit surface of the light guiding plate and engaged between the protruding ridges, wherein the set of the optical sheets comprises at least one optical sheet; and a light source arranged opposite to the light incidence surface, wherein the liquid crystal panel is arranged on the side of the set of optical sheets away from the light exit surface, and the liquid crystal panel is arranged to cover the surfaces of the protruding ridges.

In another aspect of the disclosure, there is provided a mobile terminal including the display module above.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
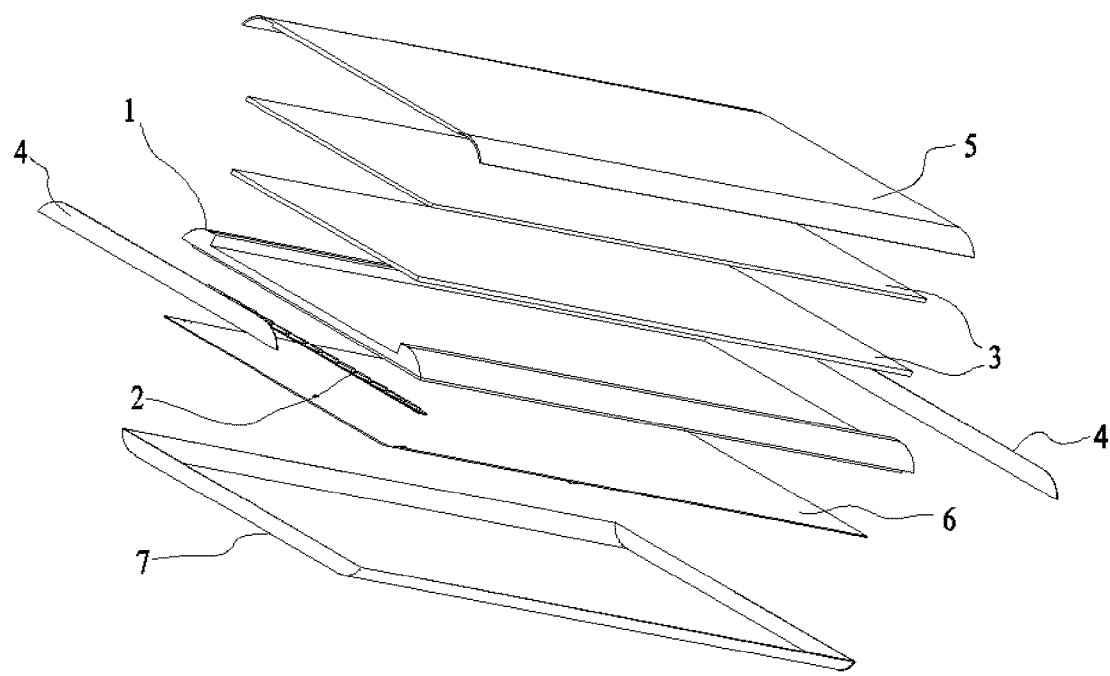
FIG. 1 illustrates an exploded view of a display module according to an embodiment of the disclosure.

Example embodiments will now be described more fully with reference to the accompanying drawings.

In the description of the disclosure, it shall be appreciated that the terms "center", "up", "down", "front", "back", "left", "right", "vertical", "horizontal", "top", "bottom", "inside", "outside", etc., indicate oriented or positional relationships which are based upon oriented or positional relationships illustrated in the drawings, and these terms are merely intended to facilitate and simplify the description of the disclosure, but not to indicate or suggest that devices or elements as they refer to must be provided in particular orientations and constructed and operating in particular orientations, so they shall not be constructed as limiting the disclosure.

Referring to FIG. 1 to FIG. 8, FIG. 1 illustrates a particular embodiment of a display module according to an embodiment of the disclosure, where the display module includes a liquid crystal panel 5 and a backlight module, and the backlight module includes:

A light guiding plate 1, which includes a light incidence surface 11 and a light exit surface 12, where protruding ridges 13 which are light transmitting members are arranged at edges of the light exit surface 12, and a part of light rays entering the light guiding plate 1 can be transmitted out at the surfaces of the protruding ridges 13; a set of optical sheets 3 adhered to the light exit surface 12 of the light guiding plate 1 and engaged between the protruding ridges 13; and a light source 2 arranged opposite to the light incidence surface 11. The liquid crystal panel 5 is arranged on the side of the set of optical sheets 3 away from the light exit surface 12, and the liquid crystal panel 5 is arranged to cover the surfaces of the protruding ridges 13. Here the protruding ridge refers to a strip-shaped protruding section. The set of optical sheets includes at least one optical sheet.

In the display module according to this embodiment, light rays emitted by the light source 2 enter the light guiding plate 1 from the light incidence surface 11, is reflected in the light guiding plate 1 and then transmitted out at the light exit surface 12, and then pass the set of optical sheets 3 so that light can be emitted in a corresponding area on the liquid crystal panel 5 and thus an image can be displayed in the corresponding area on the display module. Since the protruding ridges 13 which are light transmitting members are arranged on the edges of the light exit surface 12, a part of the light rays entering the light guiding plate 1 can be transmitted out from the surfaces of the protruding ridges 13, and also since the liquid crystal panel 5 is arranged to cover the surfaces of the protruding ridges 13, the protruding ridges 13 provide backlight for the areas on the liquid crystal panel 5 covering the protruding ridges 13, so that the light can exit from the sides of the display module and further the image can be displayed at the sides of the display module to thereby extend the angle at which and the area in which the image is displayed. Accordingly the image can be displayed at the sides of the display module, thus the display area may be extended.

Figure 2:
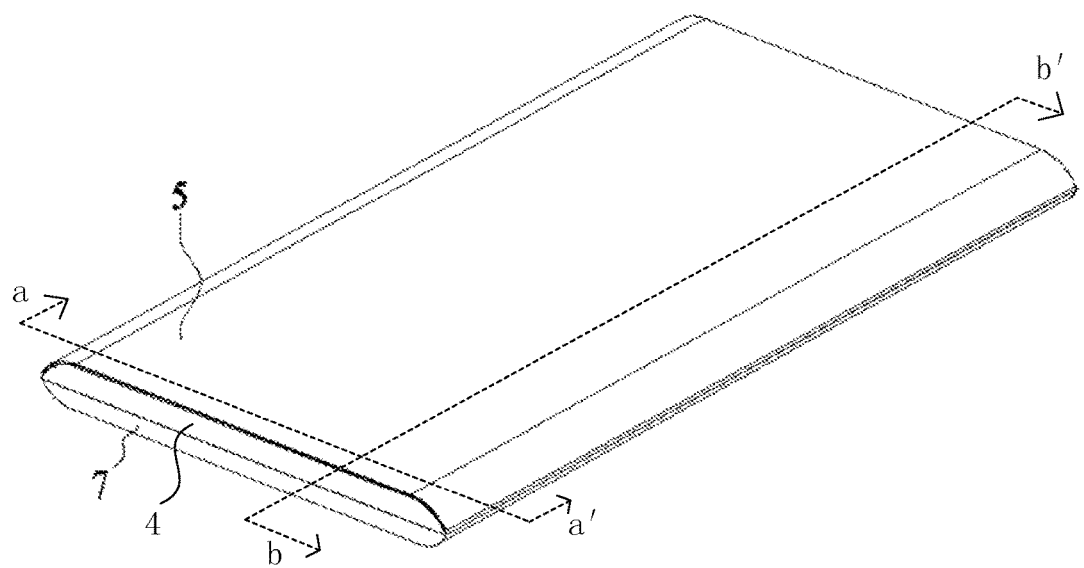
FIG. 2 illustrates an assembled view of the display module according to the embodiment of the disclosure.
Figure 3:
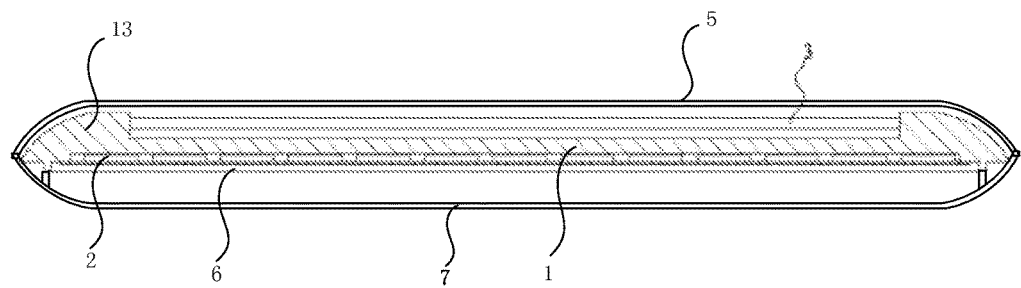
FIG. 3 illustrates a sectional view of the display module according to the embodiment of the disclosure along the a-a' line.

Particularly as can be apparent from FIG. 2 and FIG. 3, the liquid crystal panel 5 is arranged on the side of the set of optical sheets 3 away from the light exit surface 12, and the liquid crystal panel 5 is arranged to cover the surfaces of the protruding ridges away from the set of optical sheets 3. In this embodiment, the liquid crystal panel 5 is arranged directly on the set of optical sheets 3 and the protruding ridges 13, so the light rays emitted by the light source 2 can enter the light guiding plate 1, and the light rays entering the light guiding plate 1 can be incident on the liquid crystal panel 5 through the set of optical sheets 3 and the protruding ridges 13, to provide the liquid crystal panel 5 with backlight. And since the liquid crystal panel 5 is fitted to the surfaces of the protruding ridges away from the set of optical sheets 3, the display module can display the image at the sides thereof.

Figure 4:
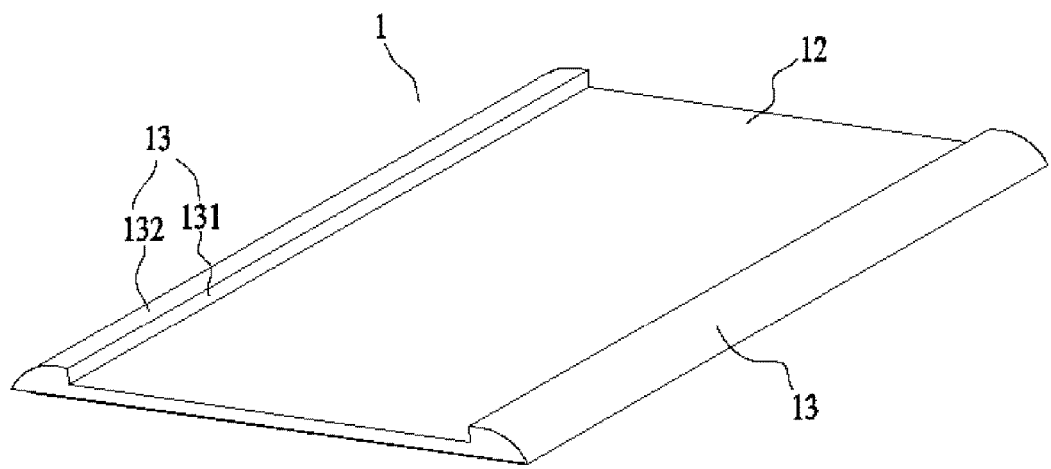
FIG. 4 illustrates a first schematic diagram of a light guiding plate in the display module according to the embodiment of the disclosure.
Figure 5:
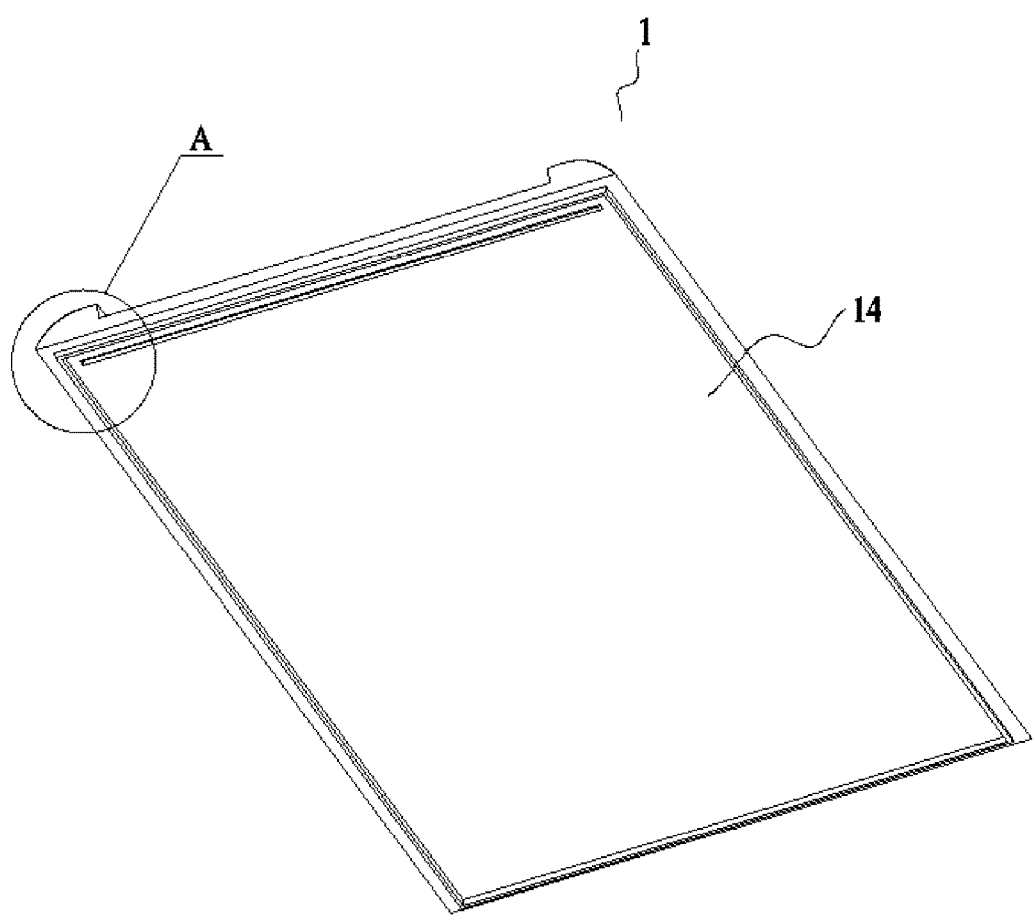
FIG. 5 illustrates a second schematic diagram of a light guiding plate in the display module according to the embodiment of the disclosure.
Figure 6:
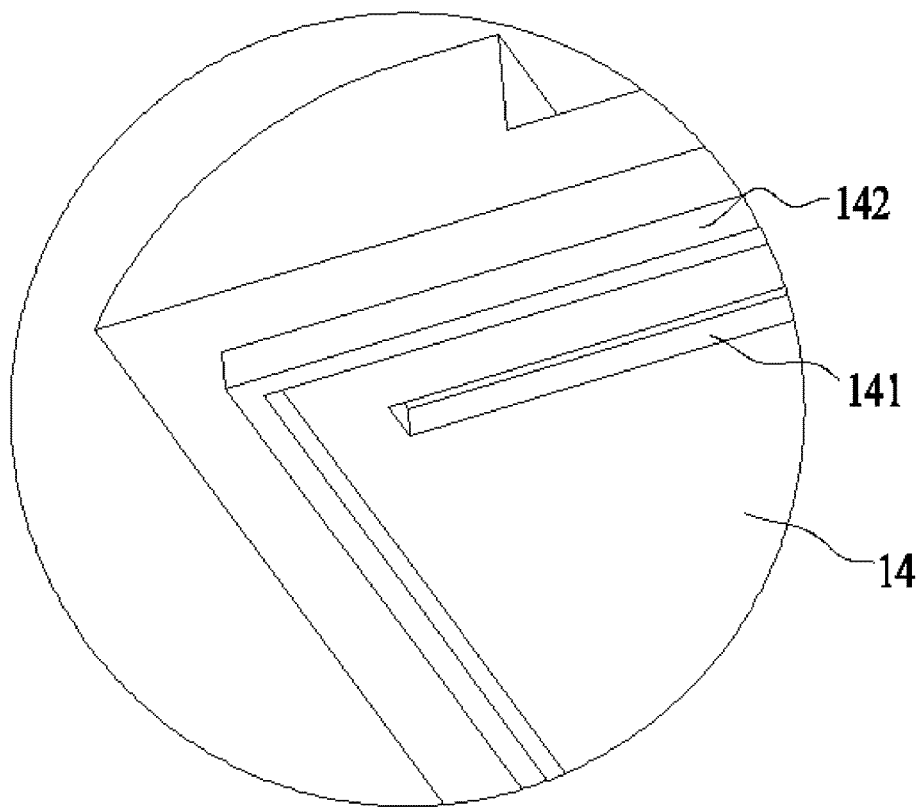
FIG. 6 illustrates a partial enlarged view of the section A in FIG. 5.
Figure 7:
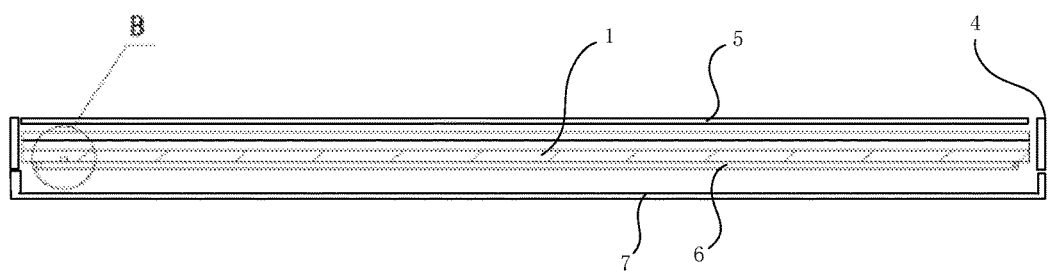
FIG. 7 illustrates a sectional view of the display module according to the embodiment of the disclosure along the b-b' line.
Figure 8:
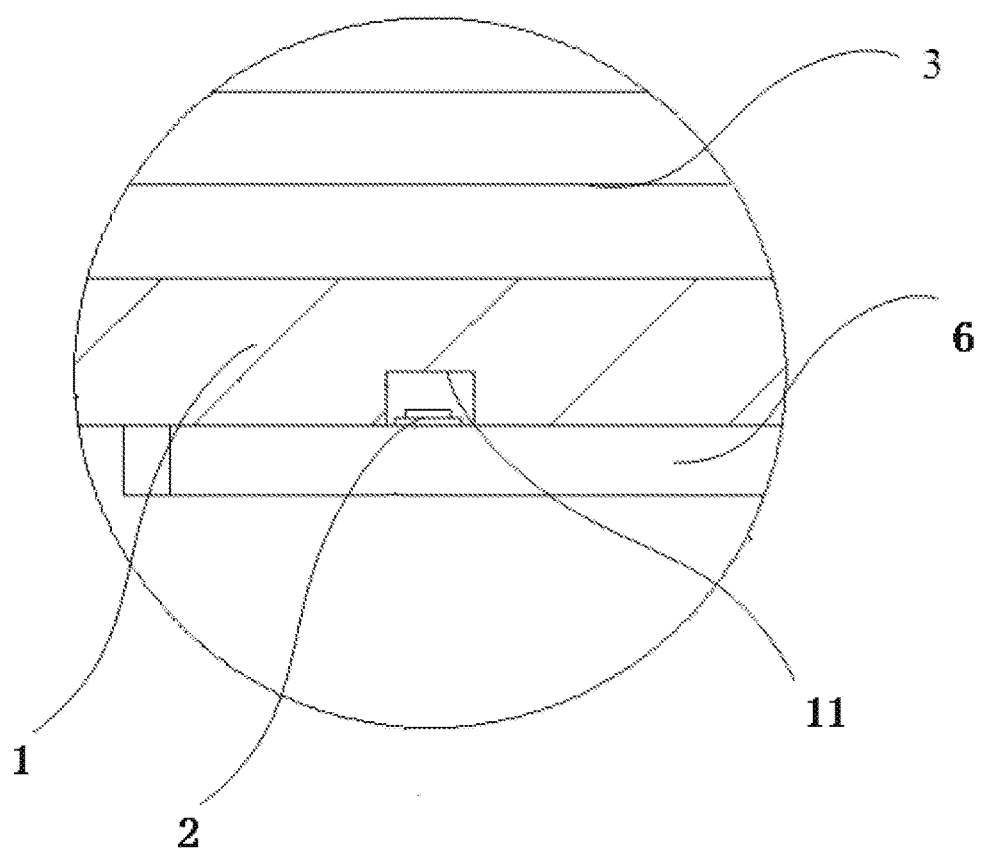
FIG. 8 illustrates a partial enlarged view of the section B in FIG. 7.

As can be apparent from FIG. 4 to FIG. 6 together, in addition to the light exit surface 12, the light guiding plate 1 further includes a reflective surface 14 arranged opposite thereto, where the reflective surface 14 can reflect the light rays to the light exit surface 12, and the protruding ridges 13 can be arranged on all the edges of the light exit surface 12.

Since the protruding ridges are made of a light transmitting material, the light rays emitted by the light guiding plate 1 can enter the protruding ridges 13 and be reflected from the surfaces of the protruding ridges. The protruding ridges 13 and the light guiding plate 1 can be arranged as two independent components, and both the protruding ridges 13 and the light guiding plate 1 can transmit light, where the protruding ridges 13 are fixed at the edges of the light guiding plate 1 through adhesion or otherwise; or the protruding ridges 13 and the light guiding plate are formed integrally. In this embodiment, the protruding ridges 13 and the light guiding plate 1 are formed integrally to thereby simplify the structure and make it convenient to install.

If the protruding ridges 13 are arranged on all the edges of the light exit surface 12, then the light can exit both the respective protruding ridges 13 and the light exit surface 12 after the light rays enter the light guiding plate 1. In this embodiment, there are two protruding ridges 13 arranged opposite to each other so that the set of optical sheets 3 can be engaged between the two protruding ridges 13, that is, the set of optical sheets 3 can be fixed by the two protruding ridges 13, to thereby dispense with a member dedicated to fixing the set of optical sheets 3 so as to simplify the structure and lower the cost.

The surfaces of the protruding ridges 13 in contact with the set of optical sheets 3 are planes, and the surfaces thereof away from the set of optical sheets 3 are cambered surfaces. Since the set of optical sheets 3 is engaged between the two protruding ridges 13, the surfaces of the protruding ridges 13 in contact with the set of optical sheets 3 are first contact surface, and when the first contact surface is a plane, the set of optical sheets 3 can be engaged firmly by the protruding ridges 13, so the surfaces of the protruding ridges 13 in contact with the set of optical sheets 3 can be arranged to be planes. The protruding ridges 13 further include second contact surfaces, where the second contact surfaces and the first contact surfaces are opposite to each other on the two sides of the protruding ridges 13. Since the liquid crystal panel cannot be bent sharply, if the surfaces of the protruding ridges 13 in contact with the liquid crystal panel 5 are provided with protruding edges or bent sharply, then it may be difficult to fit the liquid crystal panel 5 to the surfaces of the protruding ridges 13, and the liquid crystal panel 5 may be easily damaged. Thus the second contact surfaces, i.e., the surfaces of the protruding ridges 13 away from the set of optical sheets 3, can be arranged as cambered surfaces, and the sections of the liquid crystal panel 5 corresponding to the protruding ridges can be arranged in a corresponding cambered shape, to thereby accommodate a required stress on the liquid crystal panel, so that the same liquid crystal panel 5 can be arranged on the front face and the side faces of the display module so as to provide a good display effect on the display module. The cambered surfaces can be extended to the reflective surface of the light guiding plate to thereby extend the display area on the sides of the display module. The inventors have identified that when the curvature radius of the cambered surface above ranges from about 25 mm to 50 mm, the liquid crystal panel can be fitted to the protruding ridges 13 and will neither be easily broken nor be easily adhered infirmly. For example, the curvature radius of the cambered surface can be any positive integer from 25 mm to 50 mm. The curvature radius of the cambered surface is 40 mm in this embodiment.

The top surfaces of the protruding ridges 13, i.e., the surfaces of the protruding ridges away from the light guiding plate 1, can be arranged as planes or can be arranged as extensions of the cambered surfaces above. In this embodiment, the surfaces of the protruding ridges away from the light guiding plate 1 are designed as planes to thereby support the liquid crystal panel 5 so as to avoid the liquid crystal panel 5 from being arranged directly on the set of optical sheets 3.

With the integration above of the light guiding plate and the liquid crystal panel, the display module can be provided with a wider angle of light emission due to the protruding ridges 13.

The light guiding plate 1 further includes the reflective surface 14 arranged opposite to the light exit surface 12, and the surfaces of the protruding ridges 13 in contact with the liquid crystal panel 5 extend to the reflective surface 14 and contact with the reflective surface 14 to thereby extend the area where the liquid crystal panel 5 covers the protruding ridges 13, so as to further extend the area where light can be emitted on the backlight module to thereby further extend the display area at the sides thereof.

Several micro-structures (not illustrated) which can scatter the light rays are further distributed on the reflective surface 14, and the shapes of the micro-structures can be as a square pyramid, a cuboid, a hemispheroid or another shape. Since the light rays are weaker in the light guiding plate 1 remote from the light incidence surface 11 and stronger proximate to the light incidence surface 11, the micro-structures can be distributed at a higher density remote from the light incidence surface 11 and a lower density proximate to the light incidence surface 11 so that the light rays remote from the light incidence surface can be better scattered to thereby make the light rays emitted from the light exit surface 12 more uniform. A reflective sheet 6 can be arranged on the reflective surface 14 to thereby improve the utilization ratio of the light rays.

The light source 2 can be arranged in a number of alternatives, for example, in a first alternative, the light incidence surface of the light guiding plate can be a side surface of the light guiding plate, and the light source is located outside the light guiding plate and opposite to the light incidence surface; in a second alternative, a wedge-shaped section (not illustrated) is formed at a side of the light guiding plate, where a smaller end of the wedge-shaped section is arranged proximate to the inside of the light guiding plate, and a larger end thereof is arranged remote from the inside of the light guiding plate, and the end surface at the larger end of the wedge-shaped section is the light incidence surface, and the light source is located outside the wedge-shaped section and opposite to the light incidence surface; and in a third alternative, referring to FIG. 3 to FIG. 6, an installation groove 141 is arranged on the edge of the light guiding plate 1 on the reflective surface 14, the installation groove 141 is located inside the light guiding plate 1, the light source 2 is contained in the installation groove 141, and the light incidence surface 11 is the side surface or the bottom surface of the installation groove 141. Since the light source 2 is located inside the light guiding plate, the light rays emitted by the light source 2 can be made full use of without being additionally scattered. The light source 2 in both the first and second alternatives is located outside the light guiding plate 1, so that a space proximate to the light incidence surface 11 needs to be reserved to install the light source, thus making the backlight module larger in size. In the third alternative, the light source 2 is contained in the installation groove 141 arranged in the reflective surface 11 so that the light source 2 is embedded inside the light guiding plate 1, and also the side surface of the installation groove 141 can be used as the light incidence surface 11 so that the light rays emitted by the light source 2 enter the light guiding plate 1, and thus the light source 2 will not be arranged outside the light guiding plate 1, so that the backlight module can be made narrower without any influence upon the effect of light emission. Thus the third alternative is adopted in this embodiment.

Particularly in the third alternative above, different light incident surfaces 11 may be set dependent upon the light sources 2 with different light exit directions. For example, the light source 2 can be fixed on the reflective sheet 12 with the bottom surface of the installation groove 141 being the light incidence surface to thereby enable the light rays to be incidence thereon; or the light source 2 can be fixed on the side surface of the installation groove 141 remote from the center of the light guiding plate 1 with the side surface of the installation groove 141 proximate to the center of the light guiding plate 1 being the light incidence surface. When the side surface of the installation groove 141 proximate to the center of the light guiding plate 1 is arranged as the light incidence surface, in order to avoid different brightness of the light exiting the two protruding ridges 13 and a resulting influence upon the display effect, the two protruding ridges 13 can be arranged symmetrically on the two sides along the direction in which the light rays enter the light guiding plate 1, so that the propagating light rays can be transmitted out from the two protruding ridges 13 to thereby make the light emitted more uniformly at the two sides of the backlight module so as to improve the display effect.

Particularly the light source 2 can be embodied as an LED light bar, the shape and size of the installation groove 141 correspond to those of the LED light bar, so that the installation groove 141 can clamp the LED light bar. Alternatively the light source 2 can be embodied as a light emitting chip arranged on a flexible circuit board to thereby make the display module thinner.

Referring to FIG. 1 and FIG. 2, in order to improve the utilization ratio of the light rays and alleviate light leakage, the display module further includes reflective strips 4 arranged on sides of the backlight module in correspondence to the edges of the light exit surface 12 on which no protruding ridges 13 are arranged. The light rays in the light guiding plate 1 propagating to the reflective strips 4 can be reflected back by the reflective strips 4 to the inside of the backlight module to thereby alleviate light leakage so as to improve the utilization ratio of light, thus improving the display effect on the display module. The reflective strips 4 can prevent the set of optical sheets 3 from slipping from between the two protruding ridges 13 to thereby make the set of optical sheets 3 more firmed.

The display module further includes a housing 7 on which the light guiding plate 1 is fixed, and in order to support the light guiding plate 1, a protruding stage 142 is formed, on the edges of the reflective surface 14, the protruding stage 142 being against the housing 7, and the light guiding plate can be fixed by fixing the protruding stage 142 and the housing 7 to each other, and at this time the reflective sheet 6 is bonded on the reflective surface 14 and located in the area defined by the protruding stage 142. The protruding stage 142 can be structured variously, for example, as illustrated in FIG. 5 and FIG. 6, the protrude stage can be square frame structure on the reflective surface 14, and the reflective sheet 6 is located in an area surrounded by the square frame structure, or the protruding stage can be structured as a plurality of protruding bumps distributed on the edges of the reflective surface, and the reflective sheet 6 is located in an area surrounded by the respective protruding bumps. The protruding stage 142 and the light guiding plate can be formed integrally. The shape of the housing 7 can be as illustrated in the figures or can be any other shape as long as the light guiding plate is fixed and supported.

Figure 9:
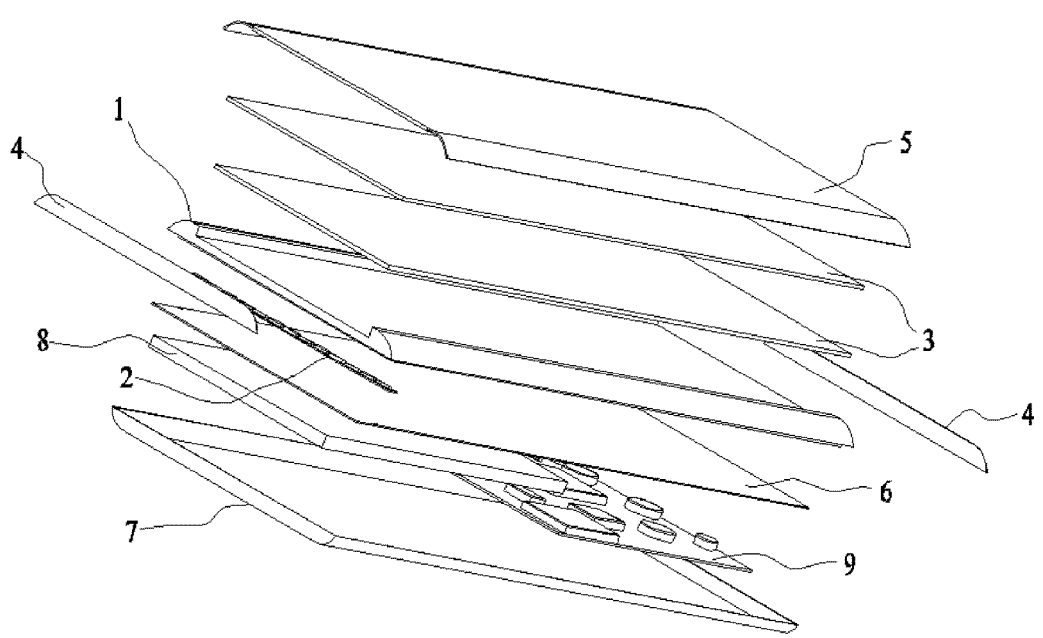
FIG. 9 illustrates an exploded view of a mobile terminal according to an embodiment of the disclosure.

As illustrated in FIG. 9, an embodiment of the disclosure further provides a mobile terminal including the display module according to any one of the embodiments above, and further including a battery 8 and a main board 9, both of which are fixed between the reflective sheet 6 and the housing 7. Those skilled in the art can appreciate that the battery 8 and the main board 9 can be arranged on the outside of the housing 7, and this embodiment can be extended by adding a back casing to protect the battery 8 and the main board 9, although a repeated description thereof will be omitted here. Since the display module applied to the mobile terminal according to this embodiment is the same as the display module according to the embodiment above of the display module, so both of them can address the same technical problem and achieve the same effect.

The disclosure provides a display module and a mobile terminal, where light rays emitted by the light source enter the light guiding plate at the light incidence surface, is reflected in the light guiding plate and then a part of the light rays are transmitted out at the light exit surface, and then pass the set of optical sheets so that light can be emitted in the corresponding area on the liquid crystal module and further an image can be displayed in the corresponding area on the liquid crystal module. Since the protruding ridges which are light transmitting members are arranged on the edges of the light exit surface, a part of the light rays entering the light guiding plate can be transmitted out from the surfaces of the protruding ridges 13, and also since the liquid crystal panel covers the surfaces of the protruding ridges 13, the protruding ridges provide backlight for the area on the liquid crystal panel covering the protruding ridges so that further the image can be displayed at the sides of the display module to thereby extend the area in which the image is displayed. Accordingly the image can be displayed at the sides of the display module in the extended display area.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display module, comprising a liquid crystal panel and a backlight module, the backlight module comprising:
   a light guiding plate comprising a light incidence surface and a light exit surface, protruding ridges which are light transmitting members arranged at edges of the light exit surface;
   a set of optical sheets arranged on the light exit surface of the light guiding plate and engaged between the protruding ridges, the set of optical sheets comprising at least one optical sheet, each of the protruding ridges including a plane surface in contact with the set of optical sheets and a cambered surface facing away from the set of optical sheets; and
   a light source arranged opposite to the light incidence surface, the liquid crystal panel arranged on a side of the set of optical sheets facing away from the light exit surface, a middle portion of the liquid crystal panel defining a planar surface, and each end portion of the liquid crystal panel corresponding to the protruding ridges curved to cover the cambered surface of a corresponding one of the protruding ridges;
   wherein at least a portion of light rays from the light source entering into the light guiding plate is emitted from the cambered surfaces of the protruding ridges to provide backlight for areas on each of the end portions of the liquid crystal panel covering one of the protruding ridges.

2. The display module according to claim 1, wherein:
   a curvature radius of the cambered surface ranges from about 25 mm to 50 mm.

3. The display module according to claim 2, wherein:
   the protruding ridges include two protruding ridges arranged opposite to each other.

4. The display module according to claim 3, further comprising:
   reflective strips arranged on sides of the backlight module in correspondence to edges of the light exit surface on which no protruding ridges are arranged, wherein light rays are reflected by the reflective strips to the inside of the backlight module.

5. The display module according to claim 1, wherein:
   the light guiding plate further comprises a reflective surface arranged opposite to the light exit surface, wherein the cambered surface extends to the reflective surface and abuts on the reflective surface.

6. The display module according to claim 5, wherein:
   the reflective surface has an installation groove arranged in an edge portion thereof, the light source is contained in the installation groove, and a side surface or a bottom surface of the installation groove is the light incidence surface.

7. The display module according to claim 6, further comprising:
   a housing, wherein the backlight module is fixed between the liquid crystal panel and the housing.

8. The display module according to claim 7, wherein:
   the housing is fixed on the reflective surface of the light guiding plate.

9. The display module according to claim 1, wherein a top surface of each of the protruding ridges, which is facing away from the light guiding plate, is a plane surface parallel to the optical sheet, and each of the end portions of the liquid crystal panel is further arranged to cover the top surface.

10. The display module according to claim 1, wherein a top surface of each of the protruding ridges, facing away from the light guiding plate, is an extension of the cambered surface, and each of the end portions of the liquid crystal panel is further arranged to cover the top surface.

11. A mobile terminal, comprising a display module comprising a liquid crystal panel and a backlight module, the backlight module comprising:
   a light guiding plate comprising a light incidence surface and a light exit surface, protruding ridges which are light transmitting members arranged at edges of the light exit surface;
   a set of optical sheets arranged on the light exit surface of the light guiding plate and engaged between the protruding ridges, the set of optical sheets comprising at least one optical sheet, each of the protruding ridges including a plane surface in contact with the set of optical sheets and a cambered surface facing away from the set of optical sheets; and
   a light source arranged opposite to the light incidence surface, the liquid crystal panel arranged on a side of the set of optical sheets facing away from the light exit surface, a middle portion of the liquid crystal panel defining a planar surface, and each end portion of the liquid crystal panel corresponding to the protruding ridges curved to cover the cambered surface of a corresponding one of the protruding ridges;

wherein at least a portion of light rays from the light source entering into the light guiding plate is emitted from the cambered surfaces of the protruding ridges to provide backlight for areas on each of the end portions of the liquid crystal panel covering one of the protruding ridges.

12. The mobile terminal according to claim 11, wherein: a curvature radius of the cambered surface ranges from about 25 mm to 50 mm.

13. The mobile terminal according to claim 12, wherein: the protruding ridges include two protruding ridges arranged opposite to each other.

14. The mobile terminal according to claim 13, further comprising:
reflective strips arranged on sides of the backlight module in correspondence to edges of the light exit surface on which no protruding ridges are arranged, wherein light rays are reflected by the reflective strips to the inside of the backlight module.

15. The mobile terminal according to claim 11, wherein: the light guiding plate further comprises a reflective surface arranged opposite to the light exit surface, wherein the cambered surface extends to the reflective surface and abuts on the reflective surface.

16. The mobile terminal according to claim 15, wherein: the reflective surface has an installation groove arranged in an edge portion thereof, the light source is contained in the installation groove, and a side surface or a bottom surface of the installation groove is the light incidence surface.

17. The mobile terminal according to claim 16, further comprising:
a housing, wherein the backlight module is fixed between the liquid crystal panel and the housing.

18. The mobile terminal according to claim 17, wherein: the housing is fixed on the reflective surface of the light guiding plate.

19. The mobile terminal according to claim 11, a top surface of each of the protruding ridges, which is facing away from the light guiding plate, is a plane surface parallel to the optical sheet, and each of the end portions of the liquid crystal panel is further arranged to cover the top surface.

20. The mobile terminal according to claim 11, wherein a top surface of each of the protruding ridges, facing away from the light guiding plate, is an extension of the cambered surface, and each of the end portions of the liquid crystal panel is further arranged to cover the top surface.

* * * * *